United States Patent [19] [11] 3,972,844
Morosawa et al. [45] Aug. 3, 1976

[54] POWDER COATING COMPOSITION

[75] Inventors: Kaoru Morosawa; Iwao Maruyama; Shigemasa Kaneda, all of Tokyo; Mitsuo Nishimura, Nishinomiya; Kiyoshi Taki, Amagasaki; Takeshi Kuninori, Sakai, all of Japan

[73] Assignee: Shinto Paint Co., Ltd., Amagasaki, Japan

[22] Filed: Aug. 6, 1974

[21] Appl. No.: 495,274

[30] Foreign Application Priority Data
Aug. 7, 1973 Japan............................... 48-88718

[52] U.S. Cl..................................... 260/16; 260/13; 260/17 R; 428/464
[51] Int. Cl.² ...................... C08L 1/12; C08L 1/14; C09J 3/14
[58] Field of Search ............... 260/13, 16, 850, 860; 117/DIG. 6, 100 C; 427/212, 213; 428/464

[56] References Cited
UNITED STATES PATENTS

| 3,039,979 | 6/1962 | Carlick et al. | 260/850 |
| 3,382,295 | 5/1968 | Taylor et al. | 260/860 |
| 3,574,154 | 4/1971 | Shaw et al. | 260/16 |
| 3,642,672 | 2/1972 | Kroekel | 260/16 |
| 3,758,633 | 9/1973 | Labana et al. | 260/16 |
| 3,763,062 | 10/1973 | Hood et al. | 260/16 |
| 3,781,381 | 12/1973 | Koleske et al. | 260/13 |

OTHER PUBLICATIONS

Grant, Def. Pub. Search Copy of S.N. 367679, filed 6/6/73, Def. Pub. No. T916011.
Harrington et al., Def. Pub. of S.N. 432018 filed 1/9/74, Def. Pub. No. T925008.

Primary Examiner—Murray Tillman
Assistant Examiner—J. Ziegler
Attorney, Agent, or Firm—Armstrong, Nikaido & Wegner

[57] ABSTRACT

A powder coating composition is disclosed for producing a specific or special pattern finish on the surface of a substrate. The composition of the invention is obtained by kneading together a mixture containing principally a thermosetting polyester resin and a minor amount of a thermoplastic cellulose ester resin powder under such temperature conditions that the polyester resin is melted but the cellulose ester resin is not melted.

4 Claims, No Drawings

POWDER COATING COMPOSITION

This invention relates to a powder coating composition for developing a specific or special pattern finish on the surface of a substrate.

In order to form or develop a regular cissing tone finish, it is known to use a special solution type paint or coating composition. However with such conventional solution type coating compositions, in forming the regular cissing tones, not only the selection of the components forming the coating composition to be used but also such external factors as the coating technique and environment conditions during the coating step have great influences on the formed pattern finish and cause its reproductivity and stability to be unsatisfactory.

On the other hand, there have recently been developed powder type coating compositions. They are little influenced by the above described external factors so that the stability of the specific pattern coating is high.

Examples of such powder coating compositions giving specific patterns such as embossed or regular cissing tone finishings, particularly crystalline patterns, hammer tone finishes or wrinkle finishes are disclosed in Japanese Pat. Nos. 7492/1973 and 7686/1973. These coating compositions are those obtained by separately preparing in advance two kinds of resin powder different from each other in the particle size or molten viscosity and then mixing them with each other. However, the pattern to be obtained from such powder coating composition is the so-called citron-skin finish and is nonuniform rough embossing pattern, which is different from uniform and compact embossing regular cissing tones obtained from a conventional solution type regular cissing tone forming coating composition, and therefore is inferior in the design and appearance.

In contrast thereto, the powder coating composition for specific pattern finishes according to the present invention is different from the above mentioned conventional ones in the producing process and composition. According to the present invention, specific pattern finishes such as homogeneous dense so-called regular cissing tones different from citron-skin finishes are obtained and are high in the design or decorative value.

Therefore, an object of the present invention is to provide a powder coating composition from which uniform dense embossing pattern finishes can be obtained.

The specific pattern finishes or regular cissing tones so called in the present invention are pattern finishes (formed on a smooth surface of a substrate) composed of uniformly and densely distributed circular or square of concavities of a diameter of about 0.05 to 2 mm. not reaching the surface of the substrate or such irregularities having cells of a diameter of 1 to 5 mm. just like those made by striking an aluminum plate with a hammer. These surface designs or patterns are generally called dull patterns, regular cissing tone patterns, crystalline patterns or hammer tone finish patterns.

The present invention is a colored or non-colored powder coating composition for developing specific pattern finishes obtained by kneading a mixture containing as main components (A) 100 parts by weight of a thermosetting resin which is solid or powdery at the normal or ambient temperature and (B) 0.01 to 0.5 part by weight of a thermoplastic cellulose ester type resin powder, at such a temperature that the component (A) is melted but the component (B) is not melted, and then cooling the mixture and then finely dividing the same into powder.

The thermosetting resin (A) which is solid or powdery at the normal temperature (e.g. up to 35°C.) and can be used in the present invention means a synthetic resin which can be generally used as a thermosetting powder for coating such as of a self-curing type, hardener already containing type or hardener after-adding type and is, for example, an epoxy, polyester, acryl or polyurethane type resin. The thermosetting resin may be used either alone or as a mixed with another resin compatible therewith. Further it is necessary that this component resin (A) should be solid or powdery at the normal temperature and should be able to be kneaded with the resin (B) without melting the latter. Therefore it is desirable that the melting point of the resin (A) is within a range of 50° to 120°C.

The thermoplastic cellulose ester type resin powder (B) which can be used in the present invention is a material wherein a part or all of the hydroxyl groups of cellulose is esterified with a fatty acid or an aromatic acid. The fatty acid is, for example, acetic acid, propionic acid, butyric acid or valeric acid. The aromatic acid is, for example, benzoic acid or phthalic acid. Such cellulose ester is well known in the art and is, for example, cellulose acetate, cellulose acetate butyrate, cellulose acetate propionate or cellulose phthalate.

Since it is necessary that this component (B) of the thermoplastic cellulose ester type resin powder should not be melted at the time of melting and kneading the mixture with the component (A) of the thermosetting resin (that is to say, the particles of the resin (B) should be coated with the melt of the component (A) at the time of kneading) but should be melted to become an integral part of the coating film when the coating is baked to be hardened; it is desirable that the component (B) has a melting point of 120° to 220°C. Further, though not an essential requirement, it is preferable that the particle size of the component (B) is 30 to 300 microns from the viewpoint of its dispersibility with the component (A) and such components added as required as a pigment and assistant and in view of the uniform distribution of specific patterns.

The mixing ratio (by weight) of the components (A) and (B) at the time of melting and kneading is A/B = 100/0.01 to 100/0.5. When the rate of the component (B) is less than 0.01, the distribution density of a specific pattern will be extremely low, while when it exceeds 0.5, nonuniform citron-skin finish with shallow concavities will be made. In either case, the design value as of specific patterns will reduce. Further, in the range of A/B = 100/0.05 to 100/0.1, there are obtained specific patterns which are most stable, uniform and dense in the size and distribution of the concavities.

The powder coating composition for specific pattern finishes of the present invention may further contain additives or assistants used for conventional thermosetting powder coating compositions such as a hardener, pigment, filler, metal powder and flow control agent.

In preparing the powder coating composition, the components (A) and (B) and any other additive(s) are homogeneously dry-blended at the normal or ambient temperature by means of a blender or the like in advance and then the mixture is melted, kneaded and extruded continuously under such temperature condition which melts the component (A) but does not melt the component (B), preferably at a temperature above 50°C. but below 120°C. by means of an extruder, kneader or the like. The mixture is then cooled to be or below the normal temperature, is then ground with a crusher or the like and is powdered to be of a proper particle size by means of a pulverizer or the like.

The proper particle size is preferably less than 100 microns when the powder composition is used for electrostatic spray coating, while it is less than 250 microns for electrostatic fluidized-bed coating and is less than 400 microns for fluidized-bed coating.

In preparing the coating composition according to the present invention, it is essential to knead the mixture under such a temperature at which the component (A) is melted but the component (B) is not melted. The reasons therefor are as follows.

Thus, if the components (A) and (B) are kneaded as both melted and then the cooled powdered mixture is applied and baked, the luster on the resulting coating film surface will tend to disappear and the formed patterns will tend to be coarse and to be close to a citron-skin. Further, in case the coating composition recovered from the coating step is reused, no uniform and dense regular cissing tone will be obtained, and only citron-skin finish will be obtained, thus reducing the reproductivity.

On the other hand, if a fine powder composition prepared by merely dry-blending the components (A) and (B) in the form of powder without being melted is applied and baked, regular cissing tones will be anyhow obtained but no uniform distribution will be obtained and the design effect will be low. Further when the coating composition recovered from the coating step is reused, the uniform distribution of the patterns will be greatly reduced.

On the other hand, according to the present invention, uniformly distributed dense regular cissing tones are obtained and, even when it is recycled (after recovery) and used, the same excellent regular cissing tones will be obtained.

The powder coating composition of the present invention can be applied on the surface to be coated by electrostatic powder spray coating, electrostatic fluidized-bed coating or fluidized-bed coating, and the applied coating can be baked in any suitable manner to form a film.

The present invention will be concretely explained in the following with reference to preferable examples. However, the present invention is not limited to these specific examples.

EXAMPLE 1

All the components of the below mentioned composition were pre-blended by means of a high speed mixer, and the mixture was kneaded at a temperature of 90° to 100°C. with a twin-screw extruder. Then the mixture was cooled, and ground with a crusher and powdered to be of a maximum particle size less than 100 microns with a pin-disk mill to obtain a powder coating composition for specific pattern finishes.

| Composition (by weight): | |
|---|---|
| Epoxy resin (melting point 95 to 105°C.; Epikote 1004): | 100.0 parts |
| Cellulose acetate butyrate powder (melting point 130 to 150°C.; EAB-531-1 of Eastman Chemical Products Co.): | 0.06 part |
| Hardener dicyandiamide: | 4.4 parts |
| Titanium oxide: | 40.0 parts |
| Precipitated barium sulfate: | 20.0 parts |

Then the obtained powder coating composition was electrostatically sprayed on a metal base by an electric charge of −50 KV so as to be of a film thickness of 60 to 80 microns and the coating was baked at 200°C. for 20 minutes to obtain a film surface having regular cissing tones of a diameter of about 1 mm. having a uniform distribution density.

EXAMPLE 2

A powder coating composition for specific pattern finishes was obtained by using the below mentioned composition by the same procedure as in Example 1 except that the melting and kneading was conducted at 110° – 120°C.

| Composition (by weight): | |
|---|---|
| Polyester resin (melting point 85 to 90°C.; SCADONAL P 2007 of Scado Co.): | 100 parts |
| Cellulose acetate propionate powder (melting point 200 to 210°C.; Half-second Propionate of Eastman Chemical Product Co.): | 0.5 part |
| Titanium oxide: | 20.0 parts |
| Carbon black: | 0.2 part |
| Talc: | 30.0 parts |

Then the obtained powder coating composition was electrostatically sprayed on a metal base with an electric charge of −90 KV so as to be of a film thickness of 50 to 70 microns, and the film was baked at 220°C. for 15 minutes to obtain a film surface having specific patterns of a diameter of about 0.2 to 0.7 mm. having a uniform distribution density.

EXAMPLE 3

A powder coating composition for specific pattern finishes was prepared by using the below mentioned composition and by the same procedure as in Example 1 except that the melting and kneading temperature condition was made to be 80° to 90°C.

| Composition (by weight): | |
|---|---|
| Acryl resin (melting point 80 to 95°C.; Almatex PD 2000 HF of Mitsui-Toatsu Chemical Co.): | 85.0 parts |
| Ketone resin (melting point 85 to 105°C.; ALON KR of Toa Synthetic Chemical Industrial Co.): | 15.0 parts |
| Cellulose acetate butyrate powder (melting point 115 to 165°C.; Half-Second Butyrate of Eastman Chemical Products Co.): | 0.1 part |
| Hardening agent; adipic acid: | 10.0 parts |
| Aluminum powder (Dry Alpaste P 1100 of Oriental Aluminum Co.): | 5.0 parts |
| Titanium oxide: | 5.0 parts |
| Calcium carbonate: | 35.0 parts |

A film was made in the same manner as in Example 1 to obtain a film surface similar to so-called hammer tone finishes.

EXAMPLE 4

A powder coating composition for specific pattern finishes was prepared by using the below mentioned composition and by the same procedure as in Example 1 except that the melting and kneading temperature condition was made 110° to 120°C. and the maximum particle size was made less than 400 microns.

| Composition (by weight): | | |
|---|---|---|
| Epoxy resin (melting point 95 to 105°C.; Epikote 1004 of Shell Chemical Co.): | 70.0 | parts |
| Thermoplastic acryl resin (melting point 100 to 120°C.; Acryloid of Rohm & Haas Co.): | 30.0 | parts |
| Cellulose acetate butyrate powder (melting point 195 to 205°C.; EAB-381-20 of Eastman Chemical Product Co.): | 0.02 | part |
| Titanium oxide: | 30.0 | parts |
| Cyanine Blue: | 1.0 | part |
| Dicyandiamide: | 3.5 | parts |

A metal base was preheated to 180°C. and the powder coating composition was fused on it by fluidized-bed coating so as to form a film of a thickness of 100 to 120 microns. The film was baked at 220°C. for 15 minutes to obtain a film surface having specific patterns of a diameter of 0.3 to 0.5 mm. having a uniform distribution density.

CONTROL 1

The same composition as in Example 1 was put into a pebble mill, was blended for 12 hours and was then sieved with 100 meshes (150 microns) (without melting the entire composition) to obtain a powder coating composition.

When the obtained powder coating composition was applied and baked by the same process as in Example 1, regular cissing tones were anyhow formed but were not uniformly distributed and were nonuniformly distributed and were nonuniform in the size. The film surface was not good in the luster and only the regular cissing tones low in the design effect were obtained.

CONTROL 2

A powder coating composition for specific pattern finishes was prepared by using the same composition as in Example 1 and by the same procedure as in Example 1 except that the melting and kneading temperature condition was made 140° to 150°C. and both of the compositions (A) and (B) were melted and kneaded.

When the obtained powder coating composition was applied and baked in the same manner as in Example 1, only a generally so-called citron-skinned appearance was obtained instead of regular cissing tones and the design effect as of regular cissing tones was low.

CONTROL 3

A powder coating composition was prepared in the same manner as in Example 1 except that 0.6 part of cellulose acetate was used. The composition was applied and baked in the same manner. In this case, the appearance of the coating film was not of regular cissing tones but was citron-skinned, had not luster and was close to a smooth finish.

CONTROL 4

A powder coating composition was prepared in the same manner as in Example 1 except that 0.008 part of cellulose acetate was used. The composition was applied and baked in the same manner. In this case, the appearance of the coating film was of regular cissing tones but the cissing tones were locally divided into a dense part and coarse part and were not uniform.

What we claim is:

1. A colored or noncolored powder coating composition for specific pattern finishes obtained by kneading a mixture containing as main components (A) 100 parts by weight of a thermosetting polyester resin which is solid or powdery at the normal temperature and (B) 0.01 to 0.5 part by weight of a thermoplastic cellulose ester resin powder, under such a temperature condition that the component (A) is melted but the component (B) is not melted and cooling the mixture and then powdering the same.

2. A coating composition as claimed in claim 1 wherein the component (A) has a melting point of 50° – 120°C. and the component (B) has a melting point of 120° – 220°C. which is higher than that of the component (A).

3. A coating composition as claimed in claim 1 wherein the component (B) has a particle size of 30 – 300 microns.

4. A coating composition as claimed in claim 1 wherein the component (B) is selected from the group consisting of cellulose acetate, cellulose acetate-butyrate, cellulose acetate-propionate and cellulose phthalate.

* * * * *